Figures 1, 2:
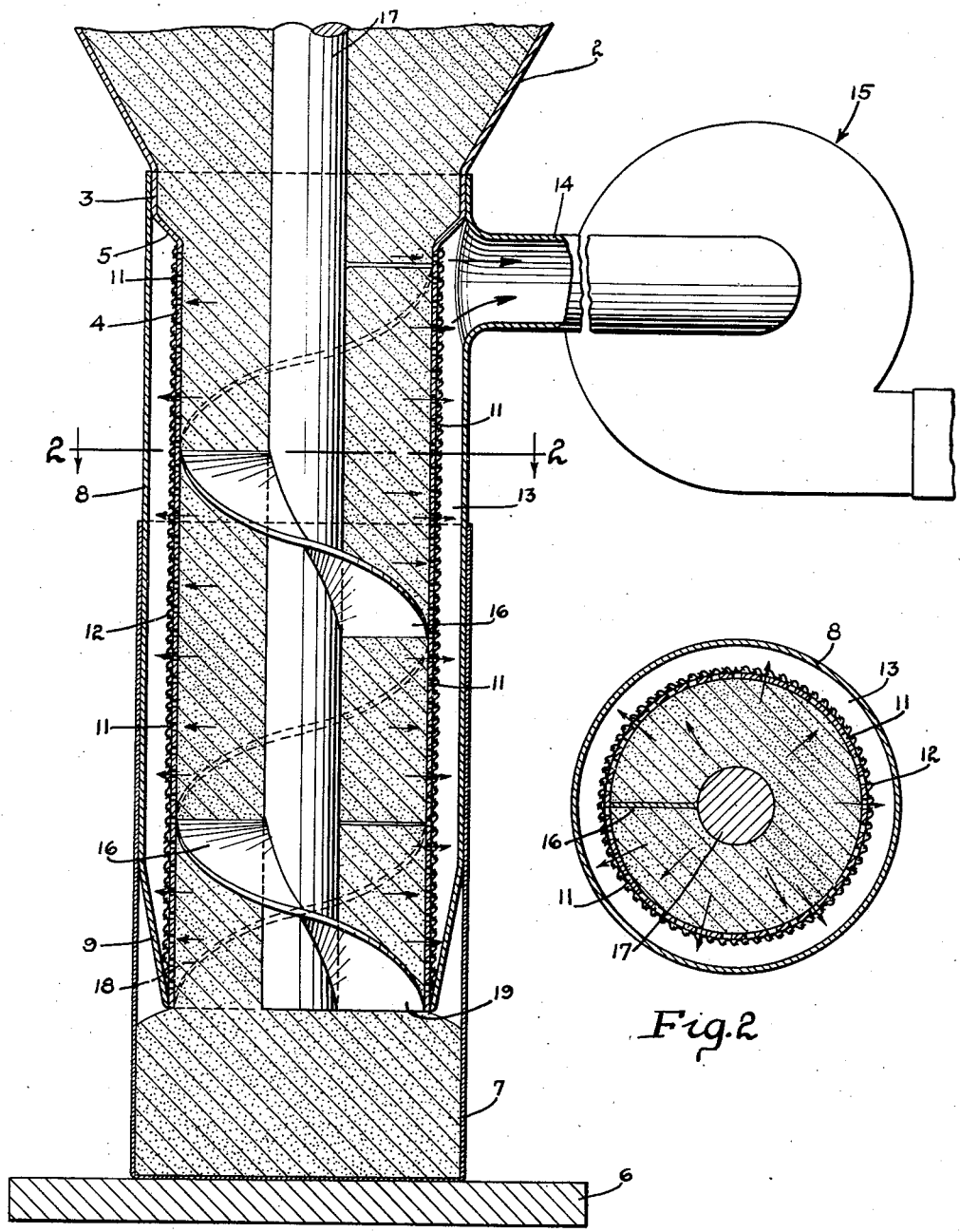

Jan. 10, 1939.　　　　D. BELCHER　　　　2,142,990

FLOUR PACKER

Filed July 25, 1936

INVENTOR
DANIEL BELCHER
BY Paul, Paul & Moore
ATTORNEYS

Patented Jan. 10, 1939

2,142,990

UNITED STATES PATENT OFFICE 2,142,990

FLOUR PACKER

Daniel Belcher, Minneapolis, Minn., assignor to Bemis Bro. Bag Co., Minneapolis, Minn., a corporation of Missouri Application July 25, 1936, Serial No. 92,591

5 Claims. (Cl. 226—25)

Flour, and other finely ground materials which are frequently packed into small containers, such as paper bags, by conventional type auger packers, often has a considerable quantity of free air entrained therewith, which has a tendency to make the flour quite fluffy. When such air-filled flour is packed into a container or bag by means of the usual auger of the flour packer, the major portion of the air entrained therein is forced out of the material through the wall of the bag, it being understood that the bags are usually made from a material which is more or less porous to permit the escape therethrough of the entrained air. It is to be understood that the porosity of the walls of the bag is such that the flour cannot escape therethrough, which results in a relatively large portion of the entrained air not escaping from the flour, as the flour is packed into the bag. This makes it rather difficult to firmly pack the flour into the bag.

The above mentioned difficulty is experienced to a greater extent when packing the flour into containers constructed of a material which is substantially non-porous such, for example, as "Cellophane", which is now being used to some extent as a packaging material for flour and other finely pulverized commodities.

It is therefore desirable that means be provided in connection with the filling tube or spout of a flour packer for removing all, or at least the greater portion of the entrained air in the flour, as the flour is being packed into the bag, thereby making it possible to more firmly pack the flour into the bags directly from the filling tube of the packer.

An object of the present invention, therefore, is to provide a filling tube having an air jacket surrounding it, which communicates with the interior of the tube through a plurality of small screened orifices and is connected to a suitable suction conduit, whereby air entrained with the flour feeding through the filling tube will be drawn therefrom into the air jacket, whereby the flour may be more firmly packed into the bags.

Other objects of the invention reside in the simple and inexpensive construction of my improved filling tube, and which is such that it may readily be attached to a conventional flour packer, substantially without altering the machine; in the cylindrical casing which fits over the filling tube proper, with its wall spaced from the walls of the filling tube, thereby to provide an air jacket which surrounds the filling tube, and which air jacket is provided with means for connecting it to a suitable suction device such as a suction fan, whereby the free air entrained with the flour is constantly being withdrawn from the filling tube through a plurality of small apertures provided in the wall thereof; in the provision of a packer tube which is so constructed that rotation of the flour by the packer auger, within the filling tube, is practically eliminated, whereby the flour may be more quickly packed into the bag; and, in the particular construction of the outer casing, which is detachably supported on the filling tube so that it may readily be removed to permit replacement of the screen or gauze fitting over the filling tube.

Other objects of the invention will appear from the following description and accompanying drawing and will be pointed out in the annexed claims.

In the accompanying drawing, there has been disclosed a structure designed to carry out the various objects of the invention, but it is to be understood that the invention is not confined to the exact features shown as various changes may be made within the scope of the claims which follow.

In the drawing:

Figure 1 is a vertical sectional view of a filling tube with the invention embodied in the construction thereof; and Figure 2 is a sectional plan view of the line 2—2 of Figure 1.

In the selected embodiment of the invention here shown, there is illustrated in Figure 1, for purposes of disclosure, a hopper, generally indicated by the numeral 2, shown terminating at its lower end in a cylindrical portion 3, to which a filling tube 4 is attached. A platform 6 is shown disposed beneath the filling tube 4 adapted to receive and support the usual containers or bag 7, during the filling operation.

An object of the present invention resides in the provision of means for removing, as far as possible, all free air entrained with the flour fed through the filling tube 4. The means provided for thus removing entrained air from the flour, is shown comprising an outer casing 8 which fits over the filling tube 4 and has its upper end engaging the cylindrical wall portion 3 of the hopper. Suitable means, not shown, is provided for detachably securing the casing 8 to the wall portion 3.

The lower end of the casing 8 preferably tapers inwardly, as shown at 9, whereby the inner diameter of the lowermost portion of the casing corresponds substantially to the outer diameter of the filling tube 4, thereby to close and seal the joint between the lower end of the casing 9 and filling tube 4, as will readily be understood by reference to Figure 1.

A plurality of small apertures or orifices 11 are provided in the wall of the filling tube 4, substantially its full length. A fine screen or gauze, generally indicated by the numeral 12, is fitted over the filling tube 4, as clearly illustrated in the drawing. This screen or gauze is preferably so fine that the flour cannot pass therethrough, whereby only the air entrained with the flour is drawn through the screen into the annular air jacket 13 surrounding the filling tube.

A suction pipe 14 is shown having one end connected to the upper end of the air jacket 13 and has its opposite end connected to a suitable suction device such, for example, as a suction fan, generally indicated by the numeral 15 in Figure 1. This fan is driven from a suitable source of power, not shown, and constantly creates a suction in the air jacket 13, thereby to draw the entrained air from the flour and discharge it to the atmosphere, or to a suitable receiving means, not shown.

A conventional packer auger 16 is shown mounted within the filling tube 4, in the usual manner, and is operated by a shaft 17 operatively connected to the usual driving mechanism of the flour packer, not shown. An auxiliary packing element 18 is shown secured to the lower end of the shaft 17 in diametrically opposed relation to the lower end portion 19 of the packer auger 16, thereby to more uniformly pack the flour into the bag or container 7.

The novel device herein disclosed, has been found very practical and efficient in operation. It removes substantially all of the entrained air contained in the flour, whereby the flour may be more firmly packed into the bag during the filling operation, thereby minimizing settling of the flour in the bag after the bag top has been closed and sealed, and whereby the bag will retain its normal well-shaped body. I have also found that the perforations 11 in the wall of the packer tube tend to prevent the flour from relatively rotating with the packer auger 16, whereby the operation of packing the flour into the bags is expedited. Also, by removing the entrained air from the flour as herein set forth, the flour may readily be packed in non-porous containers, which heretofore has been practically impossible because of the flour "spouting" from the top of the bag as a result of the air pressure in the bag.

Should the screen or gauze 12 become clogged to the extent that air can no longer readily pass therethrough, the gauze may readily be removed from the filling tube and cleaned, or a new one substituted therefor, by simply removing the outer casing 8 from the filling tube. The arrows in the drawing indicate how the entrained air is withdrawn from the filling tube into the annular air jacket 13, by the suction of the pipe 14.

I claim as my invention:
1. A filling tube having a plurality of apertures in the wall thereof, a cylindrical casing fitting over said filling tube with its wall spaced therefrom to provide an annular air jacket, said air jacket being closed at its upper and lower ends, a screen or gauze fitting over the filler tube to prevent flour from discharging through said apertures, and a suction device connected to the air jacket for drawing entrained air from the flour passing through said tube, whereby the flour may be more firmly packed in the container.

2. A filling tube having a plurality of apertures in the wall thereof, a suitable screen fitted over said tube to prevent flour or other finely pulverized material from being extracted therefrom through said aperture, a cylindrical casing fitting over the screen and said filling tube and having its wall spaced from the screen to provide an annular air jacket whose upper and lower ends are closed, and a suction trunk connected to the air jacket for drawing entrained air from the flour passing through said tube, thereby to permit the flour to be more firmly packed in the container.

3. A filling tube terminating at its upper end in an enlarged annular seat, said tube having a plurality of apertures in the wall thereof, a cylindrical casing fitting over the filling tube with its wall spaced therefrom to provide an annular air jacket, the upper end of said casing fitting said seat and suitably secured thereto, and the lower end of the casing being contracted and fitting the lower end of the tube, thereby to close the lower end of the air jacket to the atmosphere, a fine screen or gauze removably fitting over the filling tube in said air jacket, thereby to prevent flour from being drawn through said apertures, and a suction device connected to the air jacket for drawing entrained air from the flour passing through said tube, thereby to permit the flour to be more firmly packed in the container.

4. In a filling tube for a flour packer, an auger mounted for relative rotation therein, and suction means embodied in the construction of said tube for preventing the flour being packed from rotating with the auger.

5. In a filling tube for a flour packer, an auger mounted for relative rotation therein, and the wall of said tube having perforations therein communicating with a suction device, whereby substantially all of the free air entrained with the flour being packed is removed from the flour, before it is delivered into the bag, and whereby the flour may readily be packed into non-porous containers, such as "Cellophane", without spouting.

DANIEL BELCHER.